United States Patent [19]
Knirsch et al.

[11] 3,988,501
[45] Oct. 26, 1976

[54] THERMOSENSITIVE ELEMENT FOR THERMOGRAPHIC REPRODUCTION OR REGISTRATION SYSTEMS

[75] Inventors: Franco Knirsch, Pavone Canavese (Turin); Dino Lavagna, Ivrea (Turin), both of Italy

[73] Assignee: Ing. C. Olivetti & C., S.p.A., Ivrea (Turin), Italy

[22] Filed: Aug. 22, 1974

[21] Appl. No.: 499,702

Related U.S. Application Data

[63] Continuation of Ser. No. 309,838, Nov. 27, 1972, abandoned.

[52] U.S. Cl. ................................ 428/532; 428/535; 428/537; 428/913

[51] Int. Cl.[2] ................... B32B 21/04; B32B 23/04; B32B 29/00

[58] Field of Search ................ 117/36.8, 36.7, 36.2; 428/514, 524, 532, 530, 537, 526, 535, 913

[56] References Cited

UNITED STATES PATENTS

| | | | |
|---|---|---|---|
| 3,442,682 | 5/1969 | Fukawa | 117/36.8 |
| 3,451,338 | 6/1969 | Baum | 117/36.8 X |
| 3,539,375 | 11/1970 | Baum | 117/36.2 |
| 3,772,052 | 11/1973 | Kimura et al. | 117/36.8 X |

*Primary Examiner*—Lorraine T. Kendell
*Attorney, Agent, or Firm*—I. J. Schaefer

[57] ABSTRACT

A thermosensitive record medium comprising a base sheet coated with a thermosensitive mixture resulting by mixing together a crystal violet lactone and a phenolic compound in a binding and dispersing agent comprising at least 5% of nonionic cellulose ether. The use of this binder improves the stability of the mixture avoiding any unusual color reaction.

3 Claims, No Drawings

THERMOSENSITIVE ELEMENT FOR THERMOGRAPHIC REPRODUCTION OR REGISTRATION SYSTEMS

This is a continuation of application Ser. No. 309,838 filed Nov. 27, 1972, and now abandoned.

The invention is concerned with a temperature-responsive record material for use in thermographic recording and reproducing systems and, more particularly an improved heat-sensitive record material comprising a supporting sheet provided with a heat-sensitive composition containing, in a single layer, mark-forming components which react to produce a mark according to a selectively applied temperature pattern. More particularly the temperature-responsive record material according to the present invention is suitable for use in thermographic recording of alphanumeric characters in non impact printing systems where, as the writing or printing medium heated styli, thermal-printing heads or other suitable devices able to transmit heating energy are employed.

From the literature it is known that basic chromogenic colourless compounds are able to react upon contact with an acidic or ionised medium thus producing a coloured mark, and among these some ones are particularly suitable for use as temperature-responsive materials, namely: 3,3-bis(4-dimethylaminophenyl)-6-dimethylphthalide (Crystal Violet Lactone or CVL) giving a colour from blue to violet; 3,3-bis-(p-dimethylaminophenyl)-phthalide (Malachite Green Lactone or MGL) giving a green colour; Xanthene-9,o-benzoic acid, 3,6-bis-dimethylamino-9-p-nitroamiline-lactam, giving a red colour; and, as derivatives of the Rhodamine B, N-(p-nitrophenyl)-Rhodamine B-lactam (RBL) and 3′,6′-bis-diethylaminofluorane, giving a red colour. As the acidic or ionized medium for carrying out the reaction is commonly obtained using tannic acid, gallic acid, a phenol or polyphenol, anhydrides, anilides, imides, attapulgite, silica, etc.

Further, in thermography reproduction systems the use is known of layers containing, as temperature-responsive composition, a mixture of a basic chromogenic compound and of an acidic compound. By selectively applying heat to said layers, the acidic compound melts thereby giving the suitable medium for turning the basic chromogenic compound into its coloured form.

Nevertheless, temperature-responsive elements as above described show a marked tendency to develop colour also in the absence of heat, so that this phenomenon already occurs by operating the mixture of the single dispersions comprising respectively the basic chromogenic compound and the acidic compound. In fact, the dispersions of Cristal Violet Lactone and of acidic compounds, obtained by using water-soluble binders like casein, starch, modified starches, pectine polyvinylacetate/crotonic acid copolymers, alkali-soluble phenolformaldehyde resins, poly-vinylpyrrolidone and copolymers of it, gum arabic, ureaformaldehyde resins etc., when mixed, give immediately a greenish colour turning rapidly to a hell blue and blue colour. In many cases, already the CVL dispersion appears greenish coloured.

It is a main scope of the present invention the preparation of dispersions of basic chromogenic compounds and of acidic compounds, as well as of temperature-responsive layers containing same, which do not show the inconvenience of an untimely coloured reaction until their real employment in thermo-sensitive recording systems and similar.

Thus according to the invention, there is provided an improved temperature-sensitive record material for use in a thermographic recording and reproducing apparatus, comprising a supporting paper sheet carrying in a single layer a temperature-sensitive composition, resulting by mixing together separately prepared dispersions of a basic chromogenic compound and respectively of an acidic compound in a binder, said binder comprising at least 5 parts b.w of a nonionic cellulose ether.

According to the invention, it has been found that the use of nonionic cellulose ethers as the dispersing and binding agent allows the preparation of dispersions which are stable for a long time, as well as of temperature-responsive layers which are perfectly colourless at room conditions and able to promptly develop colour by heating.

Further it has been found that said dispersions can advantageously be mixed together with those binders that, according to the above introductory description, would give, when taken separately, an untimely occurring coloration in the background, here instead without giving said disadvantage.

The improvements allowed according to the present invention are due particularly to the intrinsic properties of the nonionic cellulose ethers, i.e. good binding, dispersing, emulsifying, stabilising power as well as the property of acting as nonionic surfactants.

By using dispersions prepared in solutions either from nonionic cellulose ethers or from mixtures of other binders with nonionic cellulose ethers, as well as by using temperature-responsive layers prepared from said dispersions, both the basic chromogenic compound and the acidic compound contained therein do not show any tendency to ionizate in absence of heat.

The nonionic cellulose ethers which can be advantageously employed according to the invention are methylcellulose, hydroxypropylmethylcellulose, hydroxyethylmethylcellulose and, in general, those nonionic cellulose ethers which are soluble in water.

The binders which can be advantageously employed mixed together said nonionic cellulose ethers are starch, modified starches, polyacrylamide, pectine, urea-formaldehyde resins; the relative amounts of cellulose ether to binder varying from 5 ÷ 95 parts to 100 ÷ 0 parts.

Another not negligible scope of the invention is the preparation of thermographic layers containing basic chromogenic compounds and acidic compounds dispersed in a matrix of a nonionic cellulose ether, which layers do not show adhesion or smudging phenomena where used in contact with a thermal writing head.

The binders according to the present invention are particularly suitable for the described purposes, since they possess an high softening point (higher than 200° C) and they gel by heating: Since during the thermographic reaction heat melts or vaporizes the layer and this melted state causes smudging of the thermal writing head, this advantage is avoided by adding to the temperature-responsive dispersion white or weakly coloured pigments having a good absorbing power, and able therefor to absorb the material in the melted state.

Pigments which are useful in this case are: clay, kaolin, silica, calcium carbonate, zinc oxide, titanium oxide, magnesium silicate, barium sulphate, talcum, etc.

Still another scope of the invention is the preparation of a temperature-responsive layer containing basic chromogenic compounds mixed with one or more acidic compounds dispersed in a matrix of nonionic cellulose ether containing a lubricated charge pigment or such as to exert only a poor or even no abrasive action onto the surface of the thermal writing head which moves in contact thereupon. In fact, the presence of highly absorbing pigments in the dispersion would result in slightly abrasive layers. The abrasive character of the thus prepared layer is further avoided and replaced by lubricating character by addition of a lubricating agent in the dispersion, said lubricating agent being a wax, a soap or a heavy metal or a pigment.

Preferred lubricating agents useful for the scope are calcium stearate, magnesium stearate, silver stearate, litium stearate and aluminum stearate (all having a melting point higher than 140° C, a type C wax (C wax is Registered Trade Mark for an ammide wax produced by Farbwerk Hoechat, A.G.), having a drip point 139°–144° C, and micronized talcum.

The addition of said auxiliary components to the temperature-responsive compositions according to the present invention has proved particularly advantageous in those writing systems where a thermal writing head moving in contact with the layer is employed, as described by example in U.S. patent application Ser. No. 293,732 filed Sept. 29, 1972, now U.S. Pat. No. 3,777,116 and issued to the same assignee of the present invention; in absence of said auxiliary additions, smudgment of the surface of the writing head in contact with the recording layer would occur.

It has been further observed that the addition of stearates, particularly of litium stearate, improves the resistance of the temperature-responsive layer with respect to coloration of the background by highly humidity conditions.

The following examples further illustrate the invention.

EXAMPLE I

The following dispersions are separately prepared:

A. A porcelain attritor (250 cc) was charged with 25 g of Cristal Violet Lactone (CVL), 100 g of a 1% solution of hydroxymethylcellulose having a substitution grade 19–24 by methoxyle and 4–12 by propylene glycol (solution 2% cps 400) prepared from the corresponding commercial product (Methocel 90 HG 400 cps: a Registered Trade Mark for a nonionic cellulose ether produced by the Dow Chemical Co.). The ingredients are ground for two hours and the mixture filtrated.

B. A porcelain attritor (750 cc) was charged with 20 g of 4,4'-isopropylidene-diphenol, 30 g of colloidal calcinated kaolin having an absorption index for oil of 82 cc/100 g and 200 g of Methocel 90 HG 400 cps (solution 1% in water). The ingredients are ground for 2 hours and the mixture filtrated.

12,5 parts b.w. of (A) and 250 parts b.w. of (B) were mixed together and the resulting mixture was coated on pure cellulose paper (60 g/m$^2$) thus obtaining layers of 5–10 $\mu$ and a paper weight from 4,5 to 7 g/m$^2$. The thus obtained layer gives, by heating in contact with a thermal writing head, blue coloured marks. Both the resulting marks and the non-worked background areas maintain their well-defined appearance when exposed to light and humidity.

EXAMPLE II

Same as described in Example I; for the dispersion (B) 20 g of 2,4-dihydroxy-benzophenone instead of the 4,4'-isopropylidene diphenol are employed. Results are similar.

EXAMPLE III

Like Example I, employing for dispersion (B) 20 g of 2,4, 2',4'-tetrahydroxy benzophenone. Similar results.

EXAMPLE IV

Like Example I, employing for dispersion (B) 20 g of p, p'-dihydroxy diphenyle. Similar results.

The dispersions described in the preceding and following Examples can be prepared by using all means known suitable for this purpose and the ratio between the various ingredients may variate within a large interval allowing always favourable results. Thermographic recording layers having optimum lubricating and antisticking properties are obtained by using following ratios (based on the dry):

basic chromogenic compound 3–8%; lubricating agent 8–12%; pigment 40–60%; acidic compound (phenolic) 30–50%; the binder/solids ratio may variate from ⅛ to 1/25.

Said large ratio extension allows thermographic recording paper to be obtained having different characteristics the one among the others, showing different speeds in response to the thermic action. Also in the case where a high speed of thermal response is obtained for some recording papers, the presence of the nonionic cellulose ethers and of the auxiliary compounds described above assures preservation of the white areas of the recorded papers, with good resistance to light and humidity, together with well defined marked areas.

EXAMPLE V

A thermographic recording layer is prepared according to Example I but adding to the mixture comprising 12,5 parts of (A) and 250 parts of (B), 12,5 parts of a dispersion (C) prepared from 25 g of calcium stearate in 100 g Methocel 90 HG 400 cps (1% in water).

The resulting layer shows a smooth surface without abrasive character. A thermal writing head moved in contact besides the production onto said paper of well defined marks, does not show onto itself smudginess or abrasions.

EXAMPLE VI

Following dispersions are prepared separatedly:

A. A porcelain attritor (500 cc) was charged with 25 g CVL, 25 g of litium stearate, and 200 g of a 1% solution of hydroxypropylmethylcellulose having a substitution grade 27–30 in methoxyle and 4–7.5 in propylene glycol ether, prepared from the corresponding commercial product (Methocel 65 HG 400 cps: a Registered Trade Mark for a nonionic cellulose ether produced by the Dow Chemical Co.). The ingredients are ground for 2 hours and filtered.

B. A porcelain attritor (750 cc) was charged with 20 g of 4,4'-isopropylidene diphenol, 40 g of micronised talcum and 250 g of a 1% solution of Methocel 65 HG 400 cps. The ingredients are ground for two hours and filtered.

A mixture obtained from 25 parts b.w. of (A) and 250 parts b.w. of (B) is coated onto paper. The resulting layer shows optimum thermographic and good lubrication properties.

EXAMPLE VII

By grounding and dispersing in porcelain attritors as described in the above Examples, following dispersions were prepared:

A. CVL 5 g, aluminum stearate 10 g, Methocel MC 15 cps sol. 0.5% 150 g.

B. Bisphenol A 25 g, kaolin 50 g, Methocel MC 15 cps sol. 2% 200 g.

(Methocel MC 15 cps is a Registered Trade Mark for a methylcellulose having a substitution grade in methoxyle 27.5–31.5, produced by the Dow Chemical Co.).

20 parts b.w. of (A) and 80 parts of (B) are mixed together and added with 60 g of a 8% solution of Methocel MC 15 cps. The thermographic layers prepared therefrom show excellent lubrication properties.

EXAMPLE VIII

Similar to Example VII, employing by equal ratio and with similar results, Methocel 60 HG 50 cps (Registered Trade Mark for a hydroxypropylmethylcellulose having a substitution grade in methoxyle 28–30% and in propylene glycol ether 7–12%; a product of Dow Chemical Co.).

EXAMPLE IX

Similar to Example VII, using advantageously instead of Methocel MC 15, the 50% of the total of Urecoll AK (Registered Trade Mark for a urea-formaldehyde resin produced by B.A.S.F. Badische Aniline und Soda Fabriken).

EXAMPLE X

Similar to Example VII, substituting the 50% of Methocel MC 15 with the polyacrylamide produced by the American Cyanamid Corporation, with identical favourable results.

It will be obvious to those skilled in the art that various changes may be made without departing from the scope of the invention.

What we claim is:

1. A temperature-responsive record material for use in a thermographic recording and reproducing apparatus, comprising a paper base sheet carrying in a single coating a composition, resulting by mixing together separately prepared dispersions of (A) finely divided solid crystal violet lactone and respectively of (B) a phenolic acidic compound in a binder, said binder comprising at least 5 part by weight of a non-ionic water soluble cellulose ether comprising hydroxypropylmethylcellulose which acts as a dispersing and binding agent, a lubricating agent and a pigment being incorporated respectively in said (A) and (B) dispersions and wherein said non-ionic cellulose ether is employed in a ratio of non-ionic cellulose ether to said binder which has a range from 5–95 to 100–0 parts b.w., the ratios of the components, based on the dry, being 3–8% of said crystal violet lactone, 8–12% of said lubricating agent, 40–60% of said pigment, 30–50% of said phenolic acidic compound, the ratio of said binder to the solids components having a range from 1 to 3 to 1 to 25.

2. A record material according to claim 1, wherein the lubricating agent has a melting point higher than 140° C.

3. A record material according to claim 2 wherein the binder has a softening point higher than 200° C.

* * * * *

UNITED STATES PATENT OFFICE

CERTIFICATE OF CORRECTION

PATENT NO. : 3,988,501

DATED : October 26, 1976

INVENTOR(S) : Franco Knirsch and Dino Lavagna

It is certified that error appears in the above-identified patent and that said Letters Patent are hereby corrected as shown below:

On the first page after

"[21] appln. No. 499,702 insert

--[3] Foreign Application Priority Data

November 29, 1971 Italy . . . . . .70904-A/71--.

Signed and Sealed this

Fifteenth Day of February 1977

[SEAL]

*Attest:*

RUTH C. MASON
*Attesting Officer*

C. MARSHALL DANN
*Commissioner of Patents and Trademarks*